(12) United States Patent
Chapman et al.

(10) Patent No.: US 9,572,136 B2
(45) Date of Patent: *Feb. 14, 2017

(54) METHOD OF RE-TRANSMITTING AN ORIGINAL FRAME

(71) Applicant: Nokia Solutions and Networks GmbH & Co. KG, Munich (DE)

(72) Inventors: Thomas Malcolm Chapman, South Hampton (GB); Juergen Michel, Munich (DE)

(73) Assignee: Nokia Solutions and Networks GmbH & Co. KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/525,581

(22) Filed: Oct. 28, 2014

(65) Prior Publication Data

US 2015/0103787 A1   Apr. 16, 2015

Related U.S. Application Data

(63) Continuation of application No. 11/919,254, filed as application No. PCT/GB2006/001320 on Apr. 10, 2006, now Pat. No. 8,924,822.

(30) Foreign Application Priority Data

Apr. 25, 2006 (GB) .................... 0508272.2

(51) Int. Cl.
*H04L 1/18* (2006.01)
*H04W 72/04* (2009.01)
(Continued)

(52) U.S. Cl.
CPC ........ *H04W 72/0406* (2013.01); *H04L 1/1819* (2013.01); *H04W 52/325* (2013.01); *H04W 72/0446* (2013.01); *H04W 52/44* (2013.01)

(58) Field of Classification Search
None
See application file for complete search history.

(56) References Cited

U.S. PATENT DOCUMENTS 6,289,054 B1* 9/2001 Rhee .................. H04B 1/66
375/240.12
6,735,620 B1 5/2004 Blackmore et al.
(Continued)

FOREIGN PATENT DOCUMENTS

JP         06177863 A    6/1994
JP      2003046593 A    2/2003
(Continued)

OTHER PUBLICATIONS

Universal Mobile Telecommunications Systems (UMTS); Multiplexing and Channel Coding (FDD); ETSI TS 125 212 V6.4.0 (3GPP TS 25.212 version 6.4.0 Release 6); Mar. 2005; pp. 1-5, 54-57.

(Continued)

*Primary Examiner* — M. Mujtaba Chaudry
(74) *Attorney, Agent, or Firm* — Brake Hughes Bellermann LLP

(57) ABSTRACT

Data bits are mapped to a lower number of slots than the number of slots available for a retransmission frame and control channels are transmitted in all available slots of the retransmission frame. The number of available slots in the retransmission frame is greater than the number of available slots in the original frame.

15 Claims, 1 Drawing Sheet

(51) Int. Cl.
*H04W 52/32* (2009.01)
*H04W 52/44* (2009.01)

(56) References Cited

U.S. PATENT DOCUMENTS

| | | | |
|---|---|---|---|
| 7,155,236 | B2 | 12/2006 | Chen et al. |
| 7,660,282 | B2 | 2/2010 | Sarkar |
| 2002/0114343 | A1* | 8/2002 | Lioy ............... H04L 12/2859 370/442 |
| 2003/0039229 | A1* | 2/2003 | Ostman ............ H04L 1/0001 370/335 |
| 2004/0088634 | A1* | 5/2004 | Kim ................. H04L 1/008 714/752 |
| 2004/0137931 | A1 | 7/2004 | Sarkar et al. |
| 2004/0157560 | A1* | 8/2004 | Yamasaki .......... H04L 1/0003 455/63.1 |
| 2005/0047344 | A1* | 3/2005 | Seol ............... H04W 28/22 370/235 |
| 2005/0058154 | A1 | 3/2005 | Lee et al. |

FOREIGN PATENT DOCUMENTS

| | | |
|---|---|---|
| RU | 2216867 C2 | 11/2003 |
| WO | 0180477 A1 | 10/2001 |
| WO | 03032564 A2 | 4/2003 |
| WO | 03058873 A1 | 7/2003 |
| WO | 03092213 A1 | 11/2003 |

OTHER PUBLICATIONS

Universal Mobile Telecommunications Systems; (UMTS); Physical channels and mapping of transport channels onto physical channels (FDD); ETSI TS 125 V6.4.0 (3GPP TS 25.211 Version 6.4.0 Release 6); Mar. 2005; pp. 1-4, 14, 15, 22-25.
HS-DPCCH and compressed mode; Feb. 2002; 3GPP TSG RAN WG1#34; pp. 1-2.
United Kingdom Search Report for Application No. GB0508272.2, dated Oct. 6, 2005.
Notice of Allowance for U.S. Appl. No. 11/919,254, mailed Oct. 8, 2014, 7 pages.
International Search Report for Application No. PCT/GB2006/001320, mailed Aug. 2, 2006.
Decision on Grant for Russian Application No. 2007143553, mailed Jun. 17, 2010.
R1-050366; Nokia, et al.; "E-DPDCH compressed mode method for 10 ms TTI"; 3GPP TSG-RAN WG1 Meeting #40bis; Beijing, China, Apr. 4-8, 2005.

* cited by examiner

US 9,572,136 B2

METHOD OF RE-TRANSMITTING AN ORIGINAL FRAME

CROSS REFERENCE TO RELATED APPLICATIONS

This application is a continuation of, and claims priority to, U.S. application Ser. No. 11/919,254, filed on Oct. 26, 2009, which is a national stage entry of PCT Application No. PCT/GP2006/001320, filed on Apr. 10, 2006, which, in turn, is based on and hereby claims priority to Great Britain Application No. 0508272.2, filed on Apr. 25, 2006, the disclosures of all of which are incorporated by reference herein in their entirety.

Described below is a method of retransmitting an original frame, in particular for enhanced uplink channel (E-DCH) for $3^{rd}$ generation project partnership (3GPP) frequency division duplex (FDD).

Proposals have been made that in E-DCH retransmission of a data transmission for enhanced dedicated physical data channel (E-DPDCH), where at least one of the original transmission or the retransmission is in compressed mode, should be on the basis that the mapping of data to slots is unchanged, so that if a retransmission frame has more available slots than in the original transmission, no more of them are used than were used for the original transmission and the remaining slots are subject to discontinuous transmission (DTX).

It has also been assumed that the same method should be followed for retransmission of the enhanced dedicated physical control channel (E-DPCCH).

SUMMARY

Described below is a method of retransmitting an original frame by mapping data bits to a lower number of slots than the number of slots available for a retransmission frame; and transmitting control channels in all available slots of the retransmission frame, wherein the number of available slots in the retransmission frame is greater than the number of available slots in the original frame.

The data channel cannot use all available slots, but is limited to a lower number than the total number available. The control channel uses all available slots, so optimizing required transmit power and the resulting interference and coverage.

Data bits could be mapped to a different number of slots, for example if more slots are available in the retransmission frame, but preferably, the data bits are mapped to the same number of slots as in the original frame.

The position of each slot in the retransmission frame may change, relative to the original transmission frame, so that data bits are in different slot positions for the retransmission, but preferably, the position of each slot in a retransmission frame is the same as its position in the original frame.

Preferably, the method further includes adapting the control channel power per slot of the retransmission frame, such that the average control channel power per retransmission frame is substantially unchanged with respect to the average control channel power per original frame.

In the situation where the number of slots used in the original transmission and in the retransmission is the same, preferably, the method further includes adapting the data channel power per slot of the retransmission frame, such that the average data channel power per retransmission frame is substantially unchanged with respect to the average data channel power per original frame.

Alternatively, if the number of data slots in the retransmission frame is greater than in the original frame, then preferably the power per slot is substantially unchanged, rather than the average power.

In one example, the retransmission is in an uncompressed frame.

Alternatively, the retransmission is in a compressed frame.

Preferably, the data channel is enhanced dedicated physical data channel (E-DPDCH) and the control channel is enhanced dedicated physical control channel (E-DPCCH).

In addition, the control channel includes a dedicated physical control channel (DPCCH).

Although, different TTI's can be used, preferably, the frame has a transmission time interval (TTI) of 10 ms.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1A:
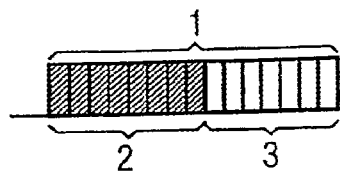
FIGS. 1A and 1B are data transmission diagrams illustrating an example of a current method of handling retransmission of data using E-DPDCH.

Reference will now be made in detail to the preferred embodiments, examples of which are illustrated in the accompanying drawings, wherein the like reference numerals refer to like elements throughout In known methods, if an initial transmission overlaps with a compressed frame the user equipment (UE), such as a mobile phone or laptop, calculates a power reduction, P to be used in enhanced transport format combination (E-TFC) selection in conjunction with the maximum power ratio granted by the Node B scheduler. The power reduction, P is related to the length of the compressed mode gap in the frame, i.e. $P=10\log_{10}(15/n_1)$, where $n_1$ is the number of slots available for the initial transmission.

The E-TFC selection is otherwise done as if the frame is not to be compressed, but the UE uses $\Delta_{non-compressed,cf}$ [dB]=granted power offset [dB]−P [dB] as the maximum allowed power ratio.

The selection of spreading factor and rate matching are done considering the actual number of slots available for transmission and all the bits after rate matching are transmitted. The purpose of the operation above is to reduce the payload transmitted in a compressed mode (CM) frame by selecting a smaller transport block than would be used for a non-compressed frame in order to maintain approximately the same maximum transmitted power over the transmitted slots. Non-scheduled transmissions are not subject to any power ratio limitations imposed to the E-TFC selection process, so the puncturing limit may be exceeded in this case with rates above 384 kbps, but this is unlikely to cause a problem.

For this known example, if a retransmission occurs in a compressed frame regardless of whether the initial transmission was compressed or not, or if a retransmission occurs in a non-compressed frame if the initial transmission was compressed, then a retransmission frame is generated assuming $n_1$ slots (i.e. the spreading factor selection and rate matching are based on $n_1$ slots); and at least the slots that overlap with the CM gap in the retransmission are subject to discontinuous transmission (DTX). $n_2$ slots of coded bits for the retransmission are transmitted in the first available $n_2$ slots in the retransmission frame, where $n_2$=min($n_1$, number of slots available for the retransmission). If more than $n_1$ slots are available for the retransmission, the last $n_3$ available slots of the frame are subject to DTX, where $n_3$=(number of slots available for retransmission-$n_1$).

Figure 1B:
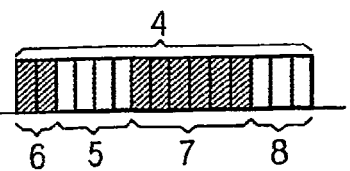

FIGS. 1A and 1B show an example of the operation for the case of a 7-slot compressed mode transmission gap in the initial transmission frame and a 4-slot compressed mode transmission gap in the retransmission frame. The frame length, or TTI, may vary, but for 3GPP FDD, it is typically 10 ms. For an initial transmission 1 a number of transmitted slots 2, $n_1$, are provided followed by a transmission gap 3. For this example $n_1$=8 and the gap is 7 slots long. In a retransmission 4 there are 15 slots in total in the frame of which 4 have been defined as a compressed mode transmission gap 5 and the number of transmitted slots $n_2$=min ($n_1$, 11)=8. These eight slots 6, 7 are distributed around the gap 5. The remaining slots 8 are calculated as $n_3$=11−$n_1$=3 and these slots are DTX slots because they are not required for data.

In a situation where all initial transmissions are compressed; where all retransmissions are compressed; or where all retransmissions of a compressed initial transmission are non-compressed, then the gain factor $\beta_{ed}$ of the E-DPDCH is scaled according to the formula below, $n_1$ being the number of available slots in the initial transmission.

$$\beta_{ed\_compressed} = \beta_{ed\_non-compressed} \times \sqrt{\frac{15}{n_1} \cdot \frac{N_{pilot,C}}{N_{pilot,N}}}$$

where:

$$\beta_{ed\_non-compressed} = 10^{\left(\frac{\Delta_{non-compressed,ef}}{20}\right)}$$

$N_{pilot,C}$ is the number of DPCCH pilot bits per slot in the current frame (regardless of whether it is an initial transmission or a retransmission) and $N_{pilot,N}$ is the number of DPCCH pilot bits per slot in non-compressed frames.

The factor $$\sqrt{\frac{N_{pilot,C}}{N_{pilot,N}}}$$

simply avoids the E-DPDCH power being increased by the offset that is applied to the DPCCH to keep the pilot energy per slot constant when the DPCCH slot format is changed between compressed and non-compressed frames. This has nothing to do with the number of transmitted slots per frame.

For E-DCH there are two sub channels; a control channel (E-DPCCH) and a data channel (E-DPDCH). In addition, a further control channel (DPCCH) has to accompany all E-DPDCH transmissions. As illustrated by FIG. 1, in a known operation, a transmission time interval (TTI) consists of 15 timeslots. The E-DPCCH signalling formation includes a retransmission sequence number and an enhanced transport format combination indicator (E-TFCI) which are 3 timeslots in length and repeated 5 times. The E-DPDCH is mapped to all 15 timeslots.

In compressed mode, the user equipment (UE) transmitter is turned off for a portion of the timeslots, known as discontinuous transmission (DTX). In this case, the E-DPCCH is transmitted in the remaining timeslots with increased power. The E-DPDCH is mapped to the remaining timeslots.

An integral part of the E-DCH operation is hybrid automatic repeat request (HARQ). If the Node B has not properly received an uplink transmission, it may request a retransmission. For the "chase combining" mode of retransmission, i.e. retransmitting the same data more than once, the retransmission must have the same form and mapping of bits as the first transmission and only the position of transmitted slots within the retransmission frame can be different. In the case where the first transmission was made in a compressed mode frame; the data will have been mapped to a reduced number of slots. If a retransmission is made in a frame that is not in compressed mode, the mapping of bits to slots for the first transmission cannot be altered. Therefore in slots that were in DTX during the first transmission, the E-DPDCH is not transmitted in a retransmission.

In order to minimize transmit power required for E-DPCCH, the E-DPCCH should be transmitted in any available slots. Thus, in the present invention, if retransmissions for E-DCH contain more non DTX slots than the first transmission, then the E-DPDCH is only transmitted using the same number of slots as in the first transmission and TX power is kept the same as the first transmission, but the E-DPCCH is transmitted using all of the slots available in the second transmission and the TX power scaled according to the number of available slots; and the DPCCH is transmitted in all available slots.

Figure 2A:
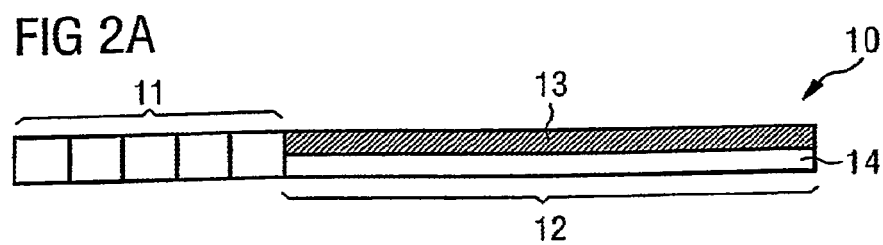
FIGS. 2A and 2B are data transmission diagrams illustrating a first example of a method of retransmitting a frame described below; and, FIGS. 3A and 3B are data transmission diagrams illustrating a second example of the method described below.
Figure 2B:
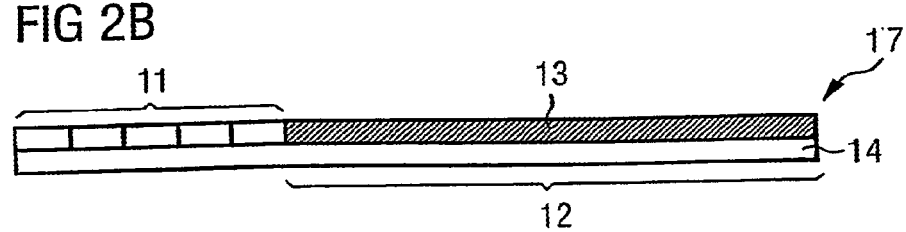

FIGS. 2A and 2B illustrate one example of the method. In FIG. 2A, a frame 10 is to be transmitted in compressed mode, so from the total number of time slots in the frame, a proportion of slots 11 are DTX. In the remaining slots 12 both the E-DPDCH 13 and the E-DPCCH 14 are transmitted for the first transmission. However, a retransmission 17 is required as shown in FIG. 2B, but this retransmission is not compressed. In this case, the E-DPDCH 13 is still limited to those slots 12 which were not DTX in the original transmission. However, E-DPCCH is not so constrained and retransmits in all available time slots 11, 12 of the second transmission.

Figure 3A:
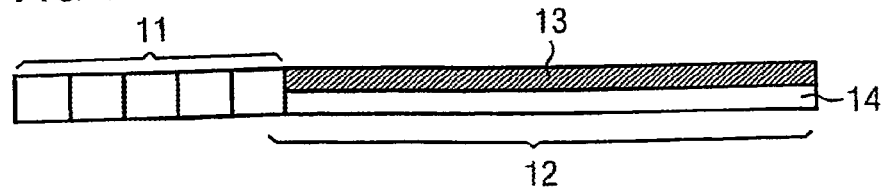
Figure 3B:
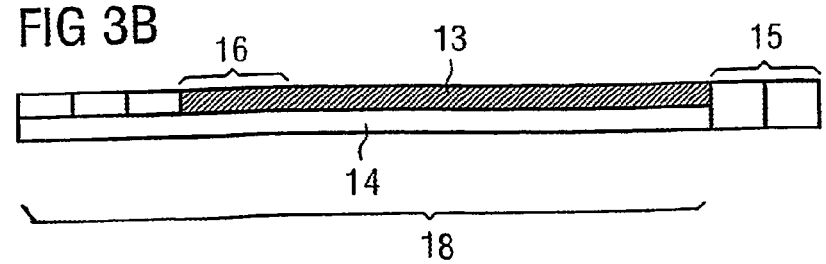

FIGS. 3A and 3B illustrate another example of the method. The first transmission, FIG. 3A, has the same arrangement as with FIG. 2A, i.e. there are a number of DTX slots 11 due to the transmission being of a compressed mode frame. The E-DPDCH 13 and E-DPCCH 14 are both transmitted in the remaining slots 12. However, the retransmission in this example is also compressed, so some of the slots 15 are DTX. In order for the E-DPDCH to be transmitted using the same number of slots, the position of these must change, so the first 3 of the original DTX slots 11 are not used, but the last two slots 16 are used to compensate for the fact that the slots 15 are now DTX. Thus, E-DPDCH 13 is transmitted on the same number of slots, but in different actual slots from in the original frame, and E-DPCCH 14 is transmitted on more slots 18 and also different ones to avoid the DTX slots in the retransmission.

The method enables the UE to transmit in a different numbers of slots with different relative power levels for DPCCH/E-DPCCH and E-DPDCH in compressed mode.

In a specific example for 3GPP FDD, using compressed frames in the uplink (UL) and where E-DCH TTI length is 2 ms, transmission gaps on the DPCH(s) due to compressed mode are handled by higher layer scheduling and the UE does not transmit E-DCH data in a TTI which fully or partly overlaps with an uplink transmission gap.

For an E-DCH TTI length of 10 ms, the parameters $n_{first}$ and $n_{last}$ are used to determine the transmission gap due to uplink compressed mode in the current radio frame. If the start of the transmission gap is allocated in the current frame $n_{first}=N_{first}$ else $n_{first}=0$. If the end of a transmission gap is allocated in the current frame $n_{last}=N_{last}$ else $n_{last}=14$.

If an initial transmission overlaps with a compressed frame the starting slot of the consecutive idle slots within the E-DCH TTI is $n_{first}$ and $n_{last}$ is the final idle slot within the 10 ms E-DCH TTI. The number of transmitted slots $n_{tx}$ is given by $n_{tx}=14+n_{first}-n_{last}$. If the initial transmission occurs in a non-compressed frame $n_{tx}=15$.

If a retransmission occurs in a compressed frame the maximum number of slots available for the retransmission is given by $n_{max}=14+n_{first}-n_{last}$. Otherwise, the maximum number of slots available for the retransmission $n_{max}$ is 15.

If the initial transmission was compressed and in the retransmission more than $n_{tx}$ slots are available for transmission ($n_{max}>n_{tx}$), the last $n_{dtx}=n_{max}-n_{tx}$ available slots of the E-DPDCH frame are idle slots. The E-DPDCH transmission gap when a retransmission occurs in a compressed frame or a retransmission occurs in a non-compressed frame, if the initial transmission was compressed, is defined as follows:

---

If $n_{max} \leq n_{tx}$
    Idle slots are slots $n_{first}, n_{first}+1, .., n_{last}$
If $n_{max} > n_{tx}$
    If $n_{last} = 14$
        Idle slots are the slots $n_{fist}-n_{dtx}, n_{first}-n_{dtx}+1, .., n_{last}$
    Else if $15-n_{dtx} > n_{last}$
        Idle Slots are the slots $n_{first}, n_{first}+1, .., n_{last}$ and $15-n_{dtx}, ..,14$
    Else
        Idle Slots are the slots $n_{first}-n_{last}-n_{dtx}+14, n_{fist}-n_{last}-n_{dtx}+15, ..,14$

---

As applied in the specific example of this invention, the method allows for chase combining during hybrid automatic repeat request (HARQ) retransmissions for a data channel, (in this case E-DPDCH), whilst optimising the required transmit power and hence the resulting interference and also coverage for the associated control channels (E-DPCCH/DPCCH). The method relies on transmitting the E-DPDCH using the same number of slots as in the first transmission, whilst transmitting the associated control channels (E-DPCCH/DPCCH) using all available slots in the retransmission and scaling the power appropriately.

The system also includes permanent or removable storage, such as magnetic and optical discs, RAM, ROM, etc. on which the process and data structures of the present invention can be stored and distributed. The processes can also be distributed via, for example, downloading over a network such as the internet. The system can output the results to a display device, printer, readily accessible memory or another computer on a network.

A description has been provided with particular reference to preferred embodiments thereof and examples, but it will be understood that variations and modifications can be effected within the spirits and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed Cir. 2004).

What is claimed is:

1. A method of retransmitting data bits of an original frame when a number of available slots in a retransmission frame is greater than a number of available slots in the original frame, the method comprising:
    mapping the data bits to fewer slots than the number of available slots in the retransmission frame; and
    transmitting bits of control channels in remaining slots of the retransmission frame after the data bits have been mapped.

2. A method according to claim 1, wherein the data bits are mapped to the same slot in the retransmission frame as in the original frame.

3. A method according to claim 1, further comprising adapting a control channel power per slot of the retransmission frame such that the average control channel power of the retransmission frame is substantially unchanged with respect to the average control channel power of the original frame.

4. A method according to claim 1, further comprising adapting a data channel power per slot of the retransmission frame such that the average data channel power of the retransmission frame is substantially unchanged with respect to the average data channel power of the original frame.

5. A method according to claim 1, wherein the retransmission frame is an uncompressed frame.

6. A method according to claim 1, wherein the retransmission frame is a compressed frame.

7. A user equipment, comprising:
    a transmitter configured to retransmit bits of an original frame when a number of available slots in a retransmission frame is greater than a number of available slots in the original frame; and
    a processor configured to map the data bits to less than all the slots in the retransmission frame,
    wherein the transmitter is further configured to transmit bits of control channels in available slots of the retransmission frame after the data bits have been mapped.

8. A user equipment according to claim 7, wherein the data bits are mapped to the same slot in the retransmission frame as in the original frame.

9. A user equipment according to claim 7, wherein the processor is further configured to adapt a control channel power per slot of the retransmission frame such that the average control channel power of the retransmission frame is substantially unchanged with respect to the average control channel power of the original frame.

10. A user equipment according to claim 7, wherein the processor is further configured to adapt a data channel power per slot of the retransmission frame such that the average data channel power of the retransmission frame is substantially unchanged with respect to the average data channel power of the original frame.

11. A user equipment according to claim 7, wherein the retransmission frame is an uncompressed frame.

12. A user equipment according to claim 7, wherein the retransmission frame is a compressed frame.

13. A base station, comprising:
    a transmitter configured to retransmit data bits of an original frame when a number of available slots in a retransmission frame is greater than a number of available slots in the original frame; and
    a processor configured to map the data bits to a portion of the available slots of the retransmission frame, wherein the transmitter is further configured to map bits of transmit control channels in slots of the retransmission frame remaining after the data bits are mapped.

14. A non-transitory computer usable medium having computer readable instructions stored therein for causing a transmitter in a user equipment to retransmit an original frame having data bits when a number of available slots in a retransmission frame is greater than a number of available slots in the original frame, for causing a processor in the user equipment to map the data bits in fewer than the number of slots available in the retransmission frame, and for further causing the transmitter in the user equipment to transmit data of other channels in remaining slots of the retransmission frame.

15. A non-transitory computer usable medium having computer readable instructions stored therein for causing a transmitter in a base station to retransmit an original frame having data bits when a number of available slots in a retransmission frame is greater than a number of available slots in the original frame, for causing a processor in the base station to map the data bits in fewer than the number of slots available in the retransmission frame, and for further causing the transmitter in the base station to transmit data of other channels in remaining slots of the retransmission frame.

* * * * *